(12) United States Patent
Power et al.

(10) Patent No.: US 9,938,073 B2
(45) Date of Patent: Apr. 10, 2018

(54) PIPE INTERMODAL LOGISTICS SYSTEM

(71) Applicant: Sea Box International, Fyshwick (AU)

(72) Inventors: Bruce Andrew Power, Calwell (AU); Shaun Moore, Ainslie (AU); Thomas Egan, Curtin (AU)

(73) Assignee: SEA BOX INTERNATIONAL, Fyshwick (AU)

( * ) Notice: Subject to any disclaimer, the term of this patent is extended or adjusted under 35 U.S.C. 154(b) by 0 days.

(21) Appl. No.: 15/319,927

(22) PCT Filed: Sep. 14, 2014

(86) PCT No.: PCT/AU2014/050228
§ 371 (c)(1),
(2) Date: Dec. 19, 2016

(87) PCT Pub. No.: WO2016/000011
PCT Pub. Date: Jan. 7, 2016

(65) Prior Publication Data
US 2017/0129691 A1    May 11, 2017

(30) Foreign Application Priority Data

Jul. 1, 2014  (AU) ............................... 2014902517
Aug. 6, 2014  (AU) ............................... 2014903047

(51) Int. Cl.
*B65D 85/20*  (2006.01)
*B60P 7/12*  (2006.01)
(Continued)

(52) U.S. Cl.
CPC ............ *B65D 85/20* (2013.01); *A47B 81/005* (2013.01); *A47B 81/007* (2013.01); *B60P 7/12* (2013.01);
(Continued)

(58) Field of Classification Search
CPC .. B65D 85/20; B65D 88/022; B65D 90/0013; A47B 81/005; A47B 81/007; F16L 3/237;
(Continued)

(56) References Cited

U.S. PATENT DOCUMENTS 2,288,622 A * 7/1942 Heigis ................. A47B 81/007
                                                    211/75
2,611,495 A * 9/1952 Weaver ................. B65D 71/70
                                                    248/146
(Continued)

FOREIGN PATENT DOCUMENTS

GB         2165204 A      4/1986
WO      03000544 A1      1/2003
(Continued)

OTHER PUBLICATIONS

International Search Written Opinion [AU] PCT/AU2014/050228 dated Nov. 25, 2014.

*Primary Examiner* — Ko H Chan
(74) *Attorney, Agent, or Firm* — Edwin S. Flores; Daniel J. Chalker; Chalker Flores, LLP

(57) ABSTRACT

The proposed invention relates to a pipe intermodal logistics apparatus and system to facilitate the transportation and storage of industrial pipe The pipe intermodal logistics apparatus includes a lower clamp which embraces the weight of one or more pipes, and an upper clamp which engages the upper surfaces of the one or more pipes to be transported. The lower and upper clamps each frictionally engage with surfaces of the one or more pipes to prevent longitudinal and lateral movement of the pipes during transportation.

12 Claims, 8 Drawing Sheets

(51) Int. Cl.
  *A47B 81/00*   (2006.01)
  *B65D 88/02*   (2006.01)
  *B65D 90/00*   (2006.01)
  *F16B 2/00*    (2006.01)
  *F16B 2/12*    (2006.01)
  *F16L 3/10*    (2006.01)
  *F16L 3/22*    (2006.01)
  *F16L 3/237*   (2006.01)

(52) U.S. Cl.
  CPC ....... *B65D 88/022* (2013.01); *B65D 90/0013* (2013.01); *F16B 2/005* (2013.01); *F16B 2/12* (2013.01); *F16L 3/10* (2013.01); *F16L 3/22* (2013.01); *F16L 3/237* (2013.01)

(58) Field of Classification Search
  CPC ..... F16L 3/22; F16L 3/10; F16B 2/005; F16B 2/12; F16B 3/10; B60P 7/12
  See application file for complete search history.

(56) References Cited

U.S. PATENT DOCUMENTS

| | | | | |
|---|---|---|---|---|
| 4,175,666 A | * | 11/1979 | Smith | A47B 81/007 211/182 |
| 4,391,377 A | * | 7/1983 | Ziaylek, Jr. | A47B 81/007 206/443 |
| 4,901,855 A | | 2/1990 | Furukawa | |
| 5,193,700 A | * | 3/1993 | Lyman | B60P 7/12 206/386 |
| 5,324,105 A | * | 6/1994 | Christensen | A47F 7/0057 206/303 |
| 6,422,795 B2 | * | 7/2002 | Holt | B60P 7/0815 410/101 |
| 7,458,553 B2 | * | 12/2008 | Tzur | B65D 19/44 248/346.02 |
| 7,997,441 B2 | * | 8/2011 | Marcel | B65D 88/128 206/386 |
| 9,573,725 B2 | * | 2/2017 | Etchegary | B63B 25/22 |
| 2010/0252471 A1 | * | 10/2010 | Homer | B65D 19/385 206/386 |
| 2011/0274511 A1 | * | 11/2011 | Ferrari | B60P 7/12 410/49 |
| 2015/0337988 A1 | * | 11/2015 | Huang | F16L 1/14 405/184.4 |

FOREIGN PATENT DOCUMENTS

| | | |
|---|---|---|
| WO | 2010147672 A1 | 12/2010 |
| WO | 2011018614 A2 | 2/2011 |
| WO | 2011048427 A2 | 4/2011 |

* cited by examiner

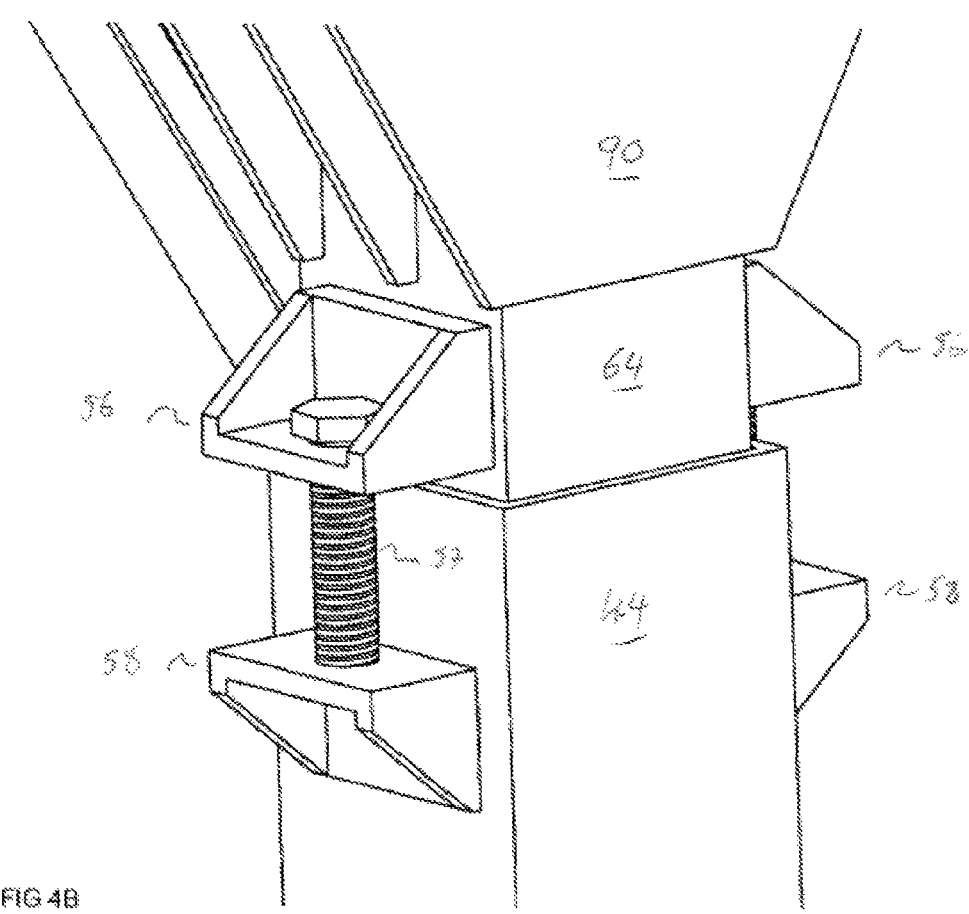

PIPE INTERMODAL LOGISTICS SYSTEM

CROSS-REFERENCE TO RELATED APPLICATIONS

This application is the National Stage of International Application No. PCT/AU2014/050228, filed on Sep. 14, 2014 claiming the priority of AU 2014902517, filed on Jul. 1, 2014 and AU 2014903047, filed on Aug. 6, 2014, the content of each of which is incorporated by reference herein.

DESCRIPTION OF INVENTION

The present invention relates to a pipe intermodal logistics apparatus and system to facilitate the transportation and storage of pipe.

TECHNICAL FIELD

The present invention further relates to an apparatus for retaining and carrying industrial pipes such that the pipes do not move during transportation.

The present invention also relates to an apparatus and system that mechanically clamps two or more industrial pipes together to form a single structural logistics entity.

BACKGROUND

It is well-known for industrial sized pipes, such as line pipes used by the gas and petro-chemical industries to be handled, stored, and transported many times between many venues using rail, ships, semi-trailers, or similar transportation vehicles before deployment. The present invention advantageously provides a logistics system which secures, protects, stores and transports industrial pipe, seamlessly from the Pipe Fabricator to the final trench.

Known pipe transportation systems are platforms or cradles that physically carry the weight of the pipe. The present invention by using the structural properties of the cargo (pipe) itself, advantageously eliminates the requirement for a standalone platform to carry the pipe. This in turn reduces the total mass of the equipment required to transport industrial pipe. This logistics efficiency provides for budget, safety and environmental benefits.

Furthermore, known pipe transportation systems require additional physical tensioning to be applied to the loads to prevent longitudinal and latitudinal movement of the pipes during transport. Longitudinal movement, of the pipes during transit may lead to pipes striking the cabin of the transport vehicle or extending outwardly from the back of a load, creating a danger to other road users or adjacent rail carriages for example. Lateral movement pipes may result in pipes striking each other on the carrying platform or cradle thereby potentially damaging the pipes. Such additional tensioning and strapping of pipes is very time consuming, often poorly regulated and is reliant on ongoing human factors to ensure load security.

The present invention advantageously eliminates any load restraint ambiguity by mechanically retaining the pipes to a level which may satisfy National and International Transport Regulations.

Further, traditional cantile stowage of pipes requires that bottom pipes in a load have enough structural integrity to withstand the weight of any pipes above them. Having pipes directly resting on each other during transport may lead to abrasive damage of the pipes as they may constantly rub against each during transport.

Alternatively, it is known to offset pipes through the use of spacers to facilitate partial loading such that any top pipe does not sit directly above the one below it during transport. However, the process of inserting spacers and offsetting industrial pipes during loading on to the transport vehicle is also very time consuming and labour intensive.

The present invention advantageously provides enhanced protection of the pipes in a load for transport by transferring the weight of the load through the pipe intermodal logistics apparatus; as well as preventing longitudinal and latitudinal movement of pipes during transit.

Throughout the specification, the use of the term intermodal refers to the fact that the apparatus and system may be deployed in a variety of transportation devices such as heavy vehicles, rail and ships as well as retained in storage facilities.

SUMMARY OF THE INVENTION

In a particular preferred embodiment, a pipe intermodal logistics apparatus for the storage and transportation of at least one pipe, comprising: a lower clamp including: a substantially horizontal base rail; a pair of upwardly extending vertical rails substantially perpendicular to the base rail, each vertical rail extending upwardly from an opposed end of the base rail; the lower clamp further including: a pair of lower brackets intermediate the vertical rails, each lower bracket having a rubber strip thereon, a first end fixed to the base rail and a second end fixed to one of the pair of vertical rails such that a lower portion of a pipe is receivable on the rubber strip of each lower bracket; and at least one lower block mounted to the base rail such that a second lower portion of a pipe is receivable on each lower block; an upper clamp including: a substantially horizontal top rail; a pair of downwardly extending vertical arms substantially perpendicular to the top rail, each vertical arm extending from an opposed end of the top rail; the upper clamp further including: a pair of top brackets intermediate the vertical arms, each top bracket having rubber strip thereon and a first end fixed to the top rail and a second end fixed to one of the pair of vertical arms such that the rubber strip of each top bracket is contactable by an upper portion of a pipe; and at least one upper block mounted to the top rail wherein each upper block is contactable by a second upper portion of a pipe; wherein the downwardly vertical extending arms are releasably fastenable to the upwardly extending vertical rails such that when in contact the frictional forces between the upper and lower brackets and pipe, and the upper and lower blocks and pipe, prevent longitudinal and lateral movement of the pipe.

In a preferred form of the invention, the vertical arms of the upper clamp are telescopically adjustable within the upwardly extending vertical rails of the lower clamp.

In a further preferred form of the invention, the vertical arms of the upper clamp upper clamp are downwardly pressured a pre-determined distance into the upwardly extending vertical rails of the lower clamp prior to being releasably fastened to the lower clamp.

In another preferred form of the invention each pipe intermodal logistics apparatus is vertically stackable on top of another pipe intermodal logistics apparatus.

Other preferred features of the various aspects of the invention will be apparent from the dependant claims and from the following description of the preferred embodiments.

BRIEF DESCRIPTION OF THE DRAWINGS

FIG. 4B illustrates a perspective view of the tensioning plates of FIG. 4A;

DETAILED DESCRIPTION

Figure 1:
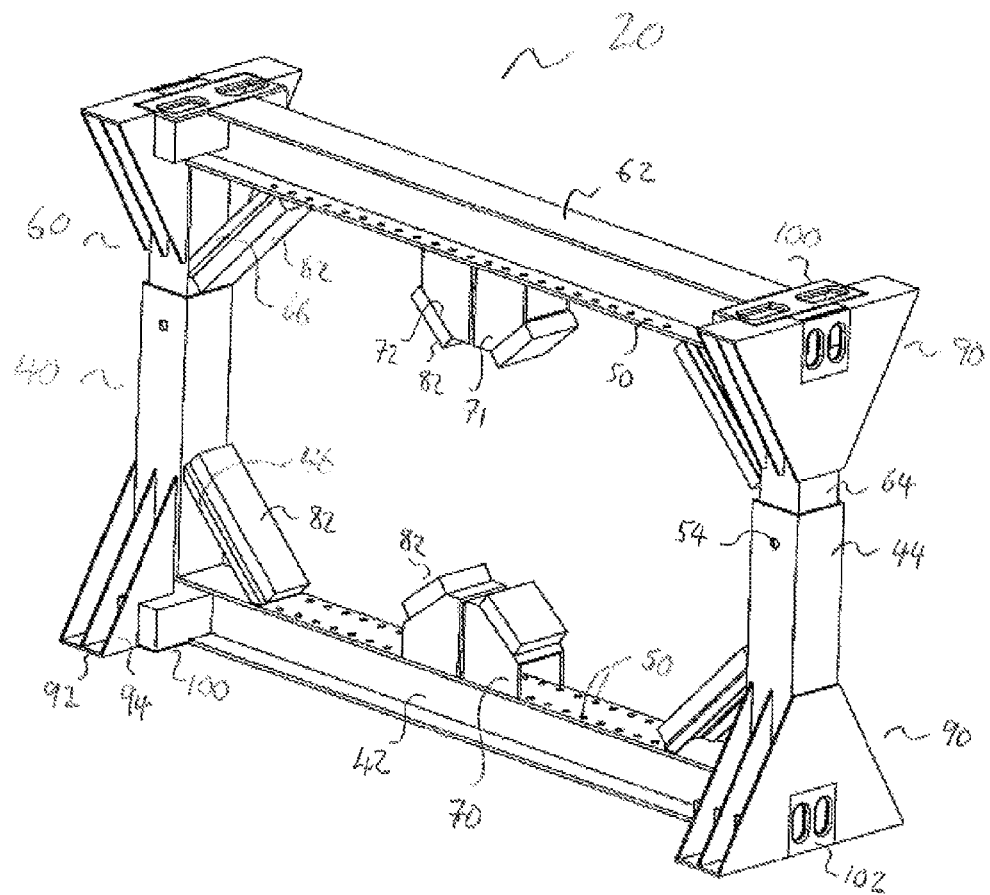
FIG. 1 illustrates a perspective view of an embodiment of the pipe intermodal logistics apparatus according to the present invention.
Figure 2:
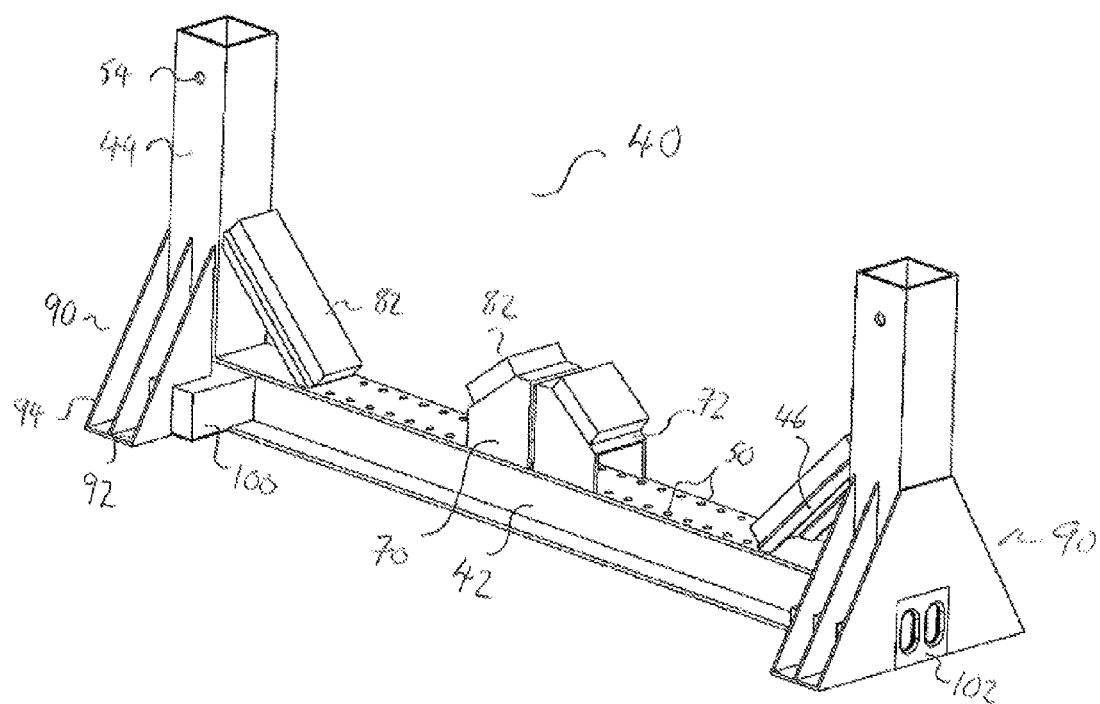
FIG. 2 illustrates a perspective view of a lower clamp of the pipe intermodal logistics apparatus of FIG. 1.
Figure 3:
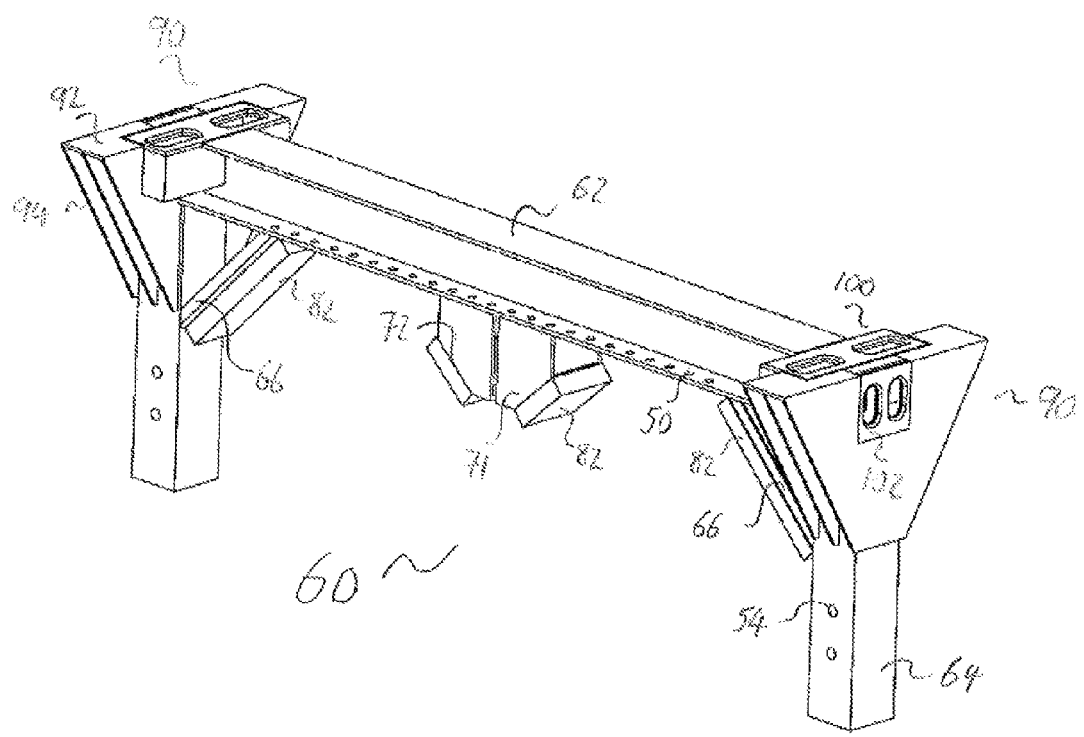
FIG. 3 illustrates a perspective view of an upper clamp of the pipe intermodal logistics apparatus of FIG. 1.

FIGS. 1-3 illustrate a pipe intermodal logistics apparatus 20 according to an embodiment of the present invention configured to transport up to two pipes.

The pipe intermodal logistics apparatus 20 includes a lower clamp 40 and an upper clamp 60. The lower clamp 40 includes a horizontal base rail 42 and a pair of vertical rails 44, one at each end of the base rail 42, extending, substantially vertically upwardly from the base rail 42. Lower clamp 40 also includes a pair of lower blocks 70 and a pair of lower brackets 46 for receiving circumferential portions of the pipe or pipes to be transported.

Similarly, upper clamp 60 includes a horizontal base top 62 and a pair of vertical arms 64 one at each end of the top rail 62, extending substantially vertically downwardly from the top rail 62. Upper clamp 60 also includes a pair of upper blocks 71 and a pair of top brackets 66 for receiving portions of the pipe or pipes to be transported.

FIG. 1 illustrates the upwardly extending vertical rails 44 of the lower clamp 40 receiving the downwardly extending vertical arms 64 of the upper clamp 60 to create a frame within which a pair of pipes may be paired, nested and subsequently stored or transported. The vertical arms 64 of the upper clamp 60 are preferably telescopically adjustable within the vertical rails 44 of the lower clamp 40. This allows the distance between the horizontal base rail 42 and horizontal top rail 62 to be selectively varied and thereby also vary the size of pipe which is retainable within the pipe intermodal logistics apparatus 20. Preferably, as illustrated in FIGS. 1-3 the vertical rails 44 and vertical arms 64 each include one or more bolt holes 54. This enables a bolt or locking pin to be inserted to release fasten the upper clamp 60 to the lower clamp 40 once the upper clamp is telescopically adjusted to the desired distance apart from the lower clamp and the respective bolt holes 54 are aligned.

In a preferred form of the invention, the lower clamp 40 and upper clamp 60 are dimensioned such that the vertical arms 64 are telescopically adjustable with respect to the vertical rails 44 so that the pipe intermodal logistics apparatus may accommodate line pipe of 42" diameter in a first position; and line pipe of 53" diameter in a second position.

As shown in FIGS. 1 and 2, fixed to each end of the base rail 42 and to each vertical rail 44 is a corner stand 90. Each corner stand 90 is fixed to the base rail 42 and each vertical rail 44 such that the corner stand 90 is flush with the base rail 42 in order to provide a stable footing and prevent the lower clamp 40 from falling over.

In a similar manner, FIGS. 1 and 3 illustrate a corner stand 90 fixed to each end the top rail 62 and to each vertical arm 64. The corner stands 90 are fixed flush to the top rail 62 to provide a continuous even surface. As a result, in the preferred form the lower clamp 40 and upper clamp 60 of the pipe intermodal logistics apparatus 20 are interchangeable in position, so that an upper clamp 60 may equally act as a lower clamp receiving the load of a pipe or pipes requiring transportation; and the lower clamp 40 may act as an upper clamp.

As shown in FIG. 2, lower clamp 40 includes a horizontal base rail 42, fixed at each end of the base rail is an upwardly extending vertical rail 44 substantially perpendicular to the base rail 42. Preferably the vertical rails 42 are welded to the base rail 42. However as would be understood by the skilled person, the base and vertical rails may be attached using alternative mechanical fastening means such as fastening nuts and bolts. The vertical rails preferably comprise RHS steel tubing whilst the horizontal rail 42 is preferably in the form of a steel I-beam.

In a preferred form, base rail 42 includes on its top surface two parallel rows of block retaining holes 50 for receiving and retaining one or more lower blocks 70 to the base rail 42. Each lower block 70 preferably includes a plurality of studs which extend from the base of the block and are received by the block retaining holes where they may be fastened to base rail 42 using fastening nuts. In this manner, the location of one or more of the lower blocks 70 along the base rail 42 may be varied. Lower blocks 70 also include a pipe receiving surface 72 which receives a lower portion of a pipe to be transported by the pipe intermodal logistics apparatus. By adjusting the position of a lower block 70 along the rail 42, the distance between the pipe receiving surface 72 of the lower block 70 and a lower bracket 46 may be varied according to the diameter of the pipe to be transported.

Preferably each lower bracket 46 is welded into position, with one end of the bracket fixed to a vertical rail 44 and the other to the horizontal base rail 42. It will be understood that alternative mechanical fastening means may also be used to fix the lower brackets 46 into position. Each bracket includes a rubber strip 82 for receiving and cushioning a portion of the pipe for transportation. Similarly, each of the pipe receiving surfaces 72 of the lower and upper blocks 70, 71 are preferably covered with a rubber strip 82 as shown. The rubber strips are preferably a minimum 15 mm thick to allow for compression and wear. However, the lower and upper blocks 70, 71 may also receive a portion of pipe without a rubber strip lined on the pipe receiving surface 72 if required. The lower and upper blocks 70, 71 are preferably steel blocks, however, these blocks may also be made of nylon, wood or a similar material.

As shown best in FIGS. 1 and 2, corner stands 90 are preferably constructed to be broadest at their base in order to provide stability to the lower clamp 40 to allow the lower clamp 40 to stand upright without any further assistance. In a preferred form, each corner stand 90 includes a base plate 92 and a number of side plates 94. The Figures currently show three sides plates for each corner stand 90. However, as would be understood by the skilled person, in alternative embodiments the number of side plates may be altered depending on the structural rigidity required. The side plates 94 are preferably welded to the base plate 94 and also to a vertical rail 44. Preferably, upper clamp 60 also includes corner stands 90 of a construction described above which are preferably welded to vertical arms 64.

In the preferred form of the present invention, upper clamp 60 shares features of construction with the lower clamp 40. As shown in FIGS. 1 to 3, the horizontal top rail 62 of upper clamp 60 also includes two parallel rows of block retaining holes 50 for receiving and retaining one or more upper blocks 71 in various locations along the top rail in the manner previously described for the lower clamp 40. Upper clamp 60 preferably also includes a pair of top brackets 66, each having a first end fixed to the horizontal top rail 62 and a second end fixed to the downwardly extending vertical arms 64 in a manner similar to that described for the lower clamp 40.

This advantageously allows the lower clamp 40 and upper clamp 60 to be interchangeable in position. That is, an upper clamp 60 may equally stand upright unassisted and be used as a clamp for receiving and load bearing one or more pipes; and a lower clamp 40 may readily be inverted, and releasably fixed to an upper clamp carrying a pipe. The lower clamp 40 in the inverted position is able to hold and retain a pipe or pipes in their allocated position on the inverted upper clamp 60 which now takes the weight of a pipe or pipes loaded thereon.

In FIGS. 1 to 3, each corner stand 90 also includes a multi-apertured base corner casting 100 which sits flush with the base plate 92. The base corner casting 100 is also fixed to the horizontal top rail 62 of an upper plate; or horizontal base rail 42 of a lower plate 40. The corner casting 100 preferably includes twin apertures therein so that the lower or upper clamps 40, 60 may be fixed to a transportation surface such as the tray of a semi-trailer or similar transportation means, using well-known ISO twistlock fasteners. Preferably, also included is a multi-apertured side corner casting 102 which sits flush with and is fixed to each side plate 94. The side corner castings 102 allow hooks with chains to attach to the upper and lower clamps in order for a crane to lift and manoeuvre a plurality of pipe intermodal logistics apparatus holding a pipe or pipes, to and from transport vehicles, or about a storage yard. Each of the base corner castings 100 are preferably welded into position. However, the skilled person would recognise that the entire corner stand 90, base and side corner castings 100, 102 may be cast as a single piece.

Figure 4:
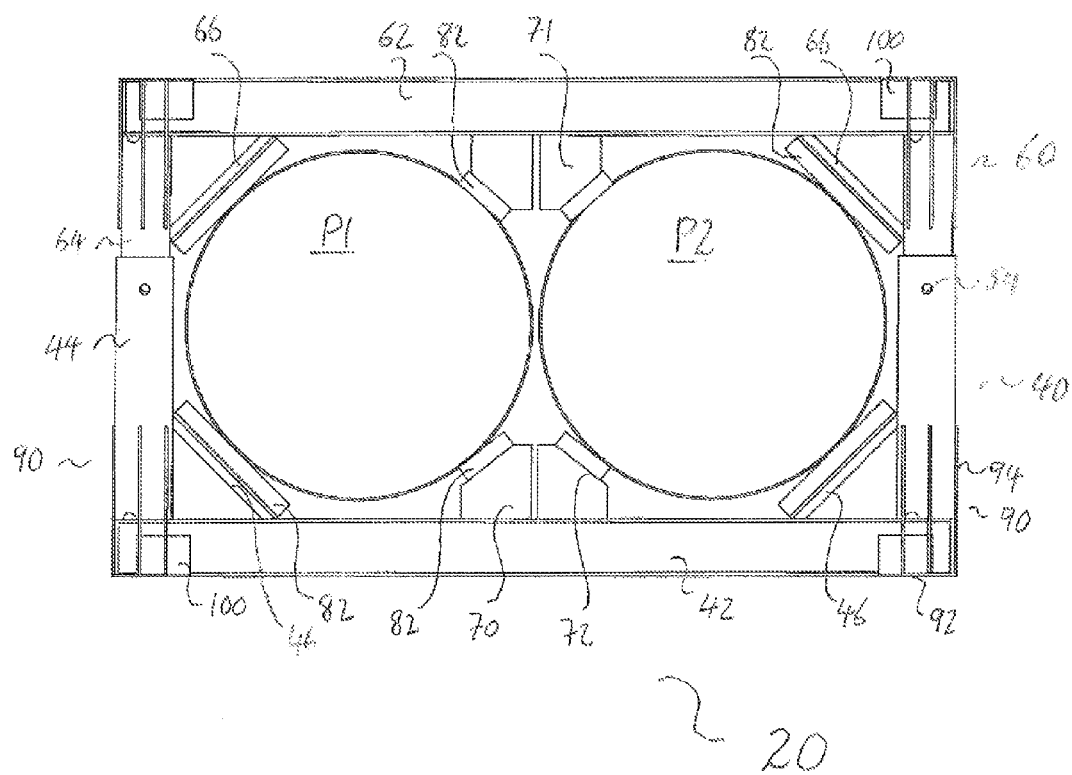
FIG. 4 illustrates an end view of the pipe intermodal logistics apparatus according to FIG. 1 holding two pipes.
Figure 5:
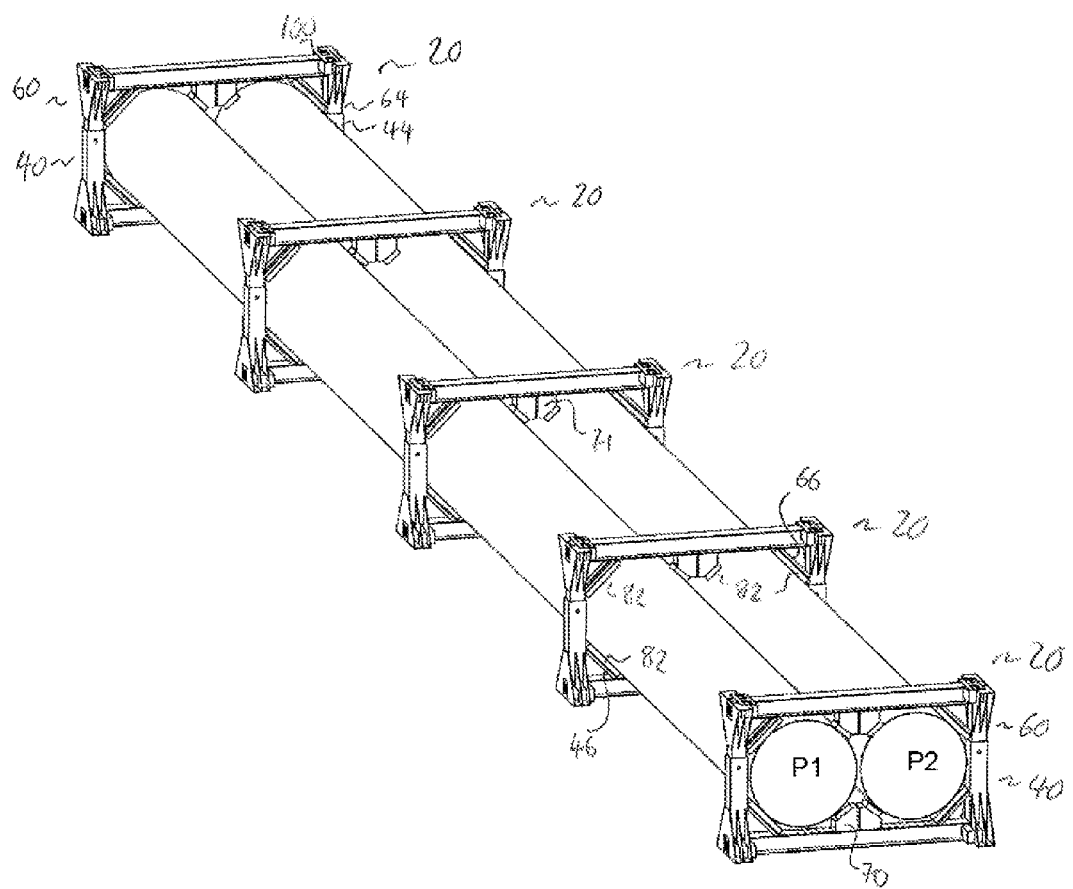
FIG. 5 illustrates a perspective view of a series of pipe intermodal logistics apparatus according to FIG. 1 retaining two pipes.

FIG. 4 illustrates an end vie r of a pipe intermodal logistics apparatus according to the preferred embodiment of the present invention retaining two pipes ready for transport. FIG. 5 illustrates a perspective view of multiple pipe intermodal logistics apparatus according a preferred embodiment of the invention which secures multiple pipes to form an intermodal platform ready for transportation.

In operation, a plurality of lower clamps 40 are linearly aligned in a spaced apart relationship. First and second pipes P1, P2 are then lowered onto the plurality of lower clamps 40 so that a lower portion of each pipe is received by the rubber strip 82 of each lower bracket 46 of each lower clamp 40; and that a second lower portion of each pipe P1, P2 is received on the rubber strip 82 fixed on the pipe receiving surface 72 of each lower block 70 adjacent respective lower brackets 46. In this manner the weight of each pipe P1 and P2 is distributed across the plurality of lower clamps 40.

The complementary upper clamps 60 for each lower clamp 40 are then lowered into each lower clamp such that the downwardly vertical extending arms 64 of each upper clamp 60 are received by the respective upwardly extending vertical rails 44 of each lower clamp 40 such that the rubber strip 82 of each top bracket 66 of each upper clamp 60 is in contact with an upper portion of each pipe P1, P2; and the rubber strip 82 of each upper block 71 contact a second upper portion of each pipe P1, P2.

Preferably, the bolt holes 54 of each of the lower and upper clamps are located such that once pipes P1 and P2 are cradled in position, a pre-determined downward force is required on the upper clamp 60 in order to partially compress each of the rubber strips 82 in contact with the pipes P1, P2 and thereby align each of the bolt holes 54. Once aligned, a bolt or locking pin (not shown) is threaded through the aligned bolt holes 54 and each upper clamp 60 is releasably fastened to a lower clamp 40. As a result of the pre-determined downward pressure provided, the engagement of the partially compressed rubber strips with multiple portions of each pipe P1, P2 provides the co-efficient of friction necessary between the pipes P1, P2 and each pipe intermodal logistics apparatus 20; to prevent any longitudinal or lateral movement of either pipe P1 or P2 within the pipe intermodal logistics apparatus.

Figure 4A:
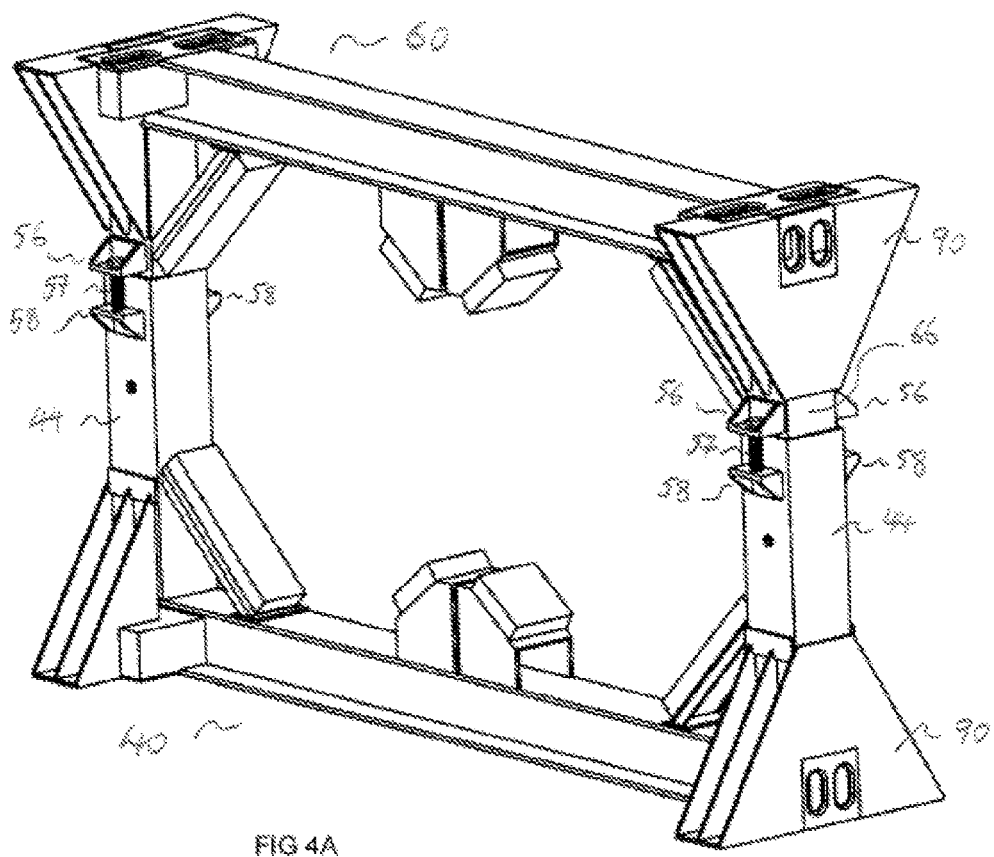
FIG. 4A illustrates a perspective view of a preferred embodiment of the pipe intermodal logistics apparatus of FIG. 1.

In a preferred embodiment of the invention shown in FIGS. 4A and 4B, each upwardly extending vertical rail 44 includes at least one lower tensioning plate 58 preferably welded there to; and each downwardly extending vertical arm 64 has a complementary upper tensioning plate 56 preferably welded to it such that the upper and lower tensioning plates align to receive tensioning bolt 57. A controlled downward force is applied to the upper clamp 60 by the tightening of tension bolt 57 which is thread though upper tensioning plate 56 and lower tensioning plate 58. The tension bolt 57 is received by a nut (not shown) welded onto the underside of lower tensioning plate 58.

By tightening each tensioning bolt 57, the upper clamp 60 and lower clamp 40 are brought together in a continuously adjustable manner until respective bolt holes 54 from each of the lower and upper clamps 40, 60 align to receive a locking pin. In a preferred embodiment, bolt holes 54 are vertically spaced apart in 5 mm increments. Each tensioning bolt 57 is then tightened to compress the rubber strips 82 onto portions of a pipe or pipes received by the pipe intermodal logistics apparatus 20. The individual tightening of each tensioning bolt 57 compensates for the wear and tear of the rubber strips 82 and eliminates any space left behind as a result of the rubber being worn away more from one rubber strip over another.

In an alternative embodiment, a pre-determined and controlled downward force may be applied to upper clamp 60 through the use of a ratcheting mechanism such as tie-down ratchet straps having straps which may hook into the respective side corner castings 102 of each of the lower and upper clamps 40, 60. The ratchet mechanism is then operated to draw the straps together and thereby force the upper clamp 60 towards lower clamp 40 until the respective bolt holes 54 align in the manner described above.

Once a pipe or pipes is locked into position within two or more pipe intermodal logistics apparatus 20, the pipes themselves provide the structural integrity during transportation of the pipes. This eliminates the need for a separate platform or base such as a flat rack or jinker to load bear and retain pipes in position.

As will be appreciated by the skilled person, the number of pipe intermodal logistics apparatus 20 required to transport a pipe is dependent upon the length of pipe. However, in a preferred form, at least one pipe intermodal logistics apparatus 20 at either end of a pipe is required.

Figure 6:
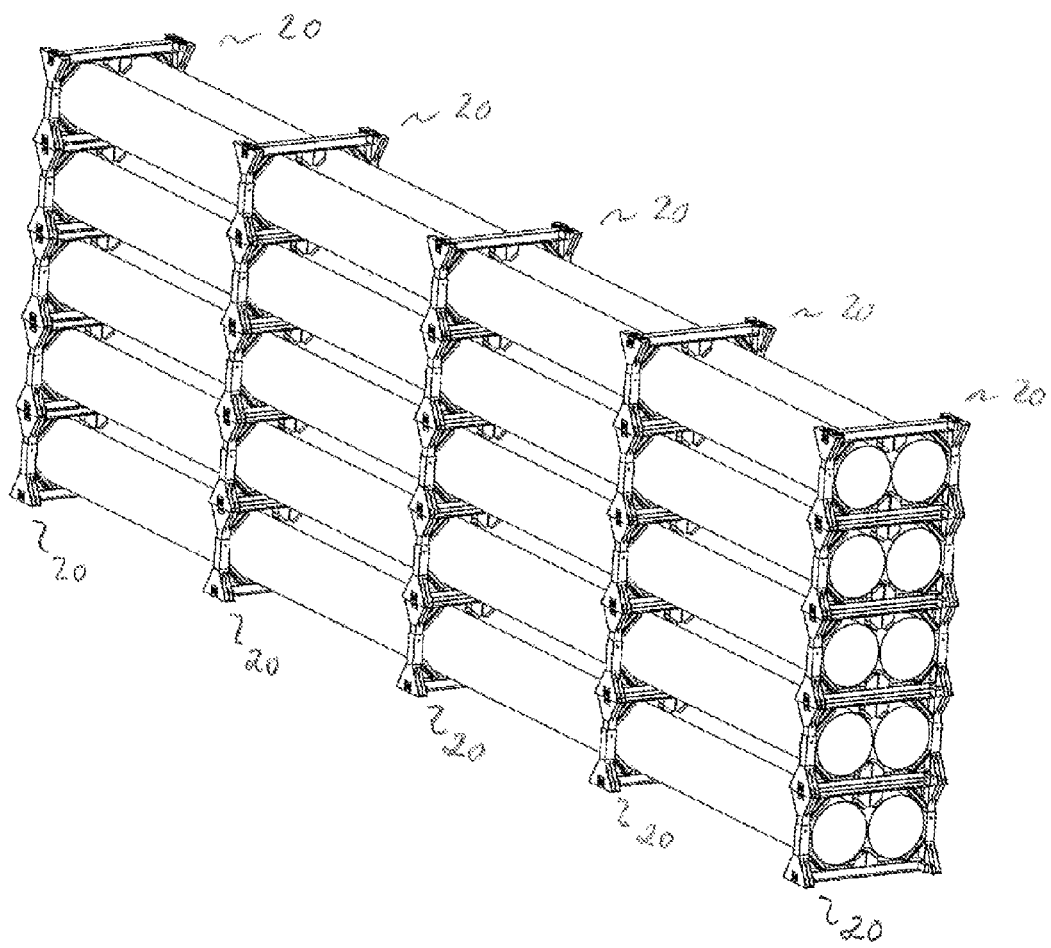
FIG. 6 illustrates a perspective view of a block of pipe intermodal logistics apparatus according to FIG. 1 retaining ten pipes in accordance with a preferred embodiment of the present invention.

As illustrated in FIG. 6, a further advantage of the preferred embodiments of the present invention is that each pipe intermodal logistics apparatus 20 may be vertically stacked upon another pipe intermodal logistics apparatus 20 below it. This creates a pipe intermodal logistics system whereby multiple layers of pipe intermodal logistics apparatus 20 may be releasable fastened to each other and create a block of two or more pipes ready for lifting and moving on/off various transport means until the block is lifted off a transportation device at its final location trench-side. Advantageously, the present invention provides the user with the flexibility to determine the number of pipes they wish to retain as a block of pipes for storage and transport as a single unit.

The embodiment of FIG. 6 show a first layer of five horizontally spaced apart pipe intermodal logistics apparatus 20, each retaining two pipes. Stacked thereon are four more vertical layers of pipe intermodal logistics apparatus 20, each carrying two pipes. Each pair of pipes is retained by five horizontally spaced apart pipe intermodal logistics apparatus 20, wherein each horizontally spaced apart pipe intermodal logistics apparatus 20 is releasably fastened to a pipe intermodal logistics apparatus 20 directly beneath it.

Preferably, each pipe intermodal logistics apparatus 20 is releasably fastened into position on top of it using a pair of ISO twist locks engaging with respective base corner castings. Hence, the embodiment of FIG. 6 shows ten pipes retained as a single block, ready for transportation as a single unit. However, as would be appreciated by the skilled person, the user may select to increase or decrease the number of horizontal layers of spaced pipe intermodal logistics apparatus 20 in order to increase or decrease the number of pipes held as a single block ready for further operations. The pipe intermodal logistics system illustrated in FIG. 6 thereby creates a logistics advantage in the handling and transportation of pipes without the need for any additional platforms or multiple tying and untying, of a load of pipes. For example, a single block of ten pipes per FIG. 6 may be craned into a ship's holding at once, transported to another destination, then lifted out onto a rail or road vehicle, either as the same block of ten pipes, or in sub-groups thereof. The block of pipes may have one or more horizontal layers of multiple intermodal logistics apparatus 20 removed from the layer or layers below it depending on which row of ISO twist locks is unfastened. Advantageously, as illustrated in FIG. 6, none of the pipes is in contact with each other or load bearing any other pipe whilst in storage or transit.

Throughout this specification and the claims which follow, unless the context, requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A pipe intermodal logistics apparatus for the storage and transportation of at least one pipe, comprising:
   a lower clamp including:
      a substantially horizontal base rail;
      a pair of upwardly extending vertical rails substantially perpendicular to the base rail, each vertical rail extending upwardly from an opposed end of the base rail;
   the lower clamp further including:
   a pair of lower brackets intermediate the vertical rails, each lower bracket having a rubber strip thereon, a first end fixed to the base rail and a second end fixed to one of the pair of vertical rails such that a lower portion of a pipe is receivable on the rubber strip of each lower bracket; and
   at least one lower block mounted to the base rail such that a second lower portion of a pipe is receivable on each lower block;
   an upper clamp including:
      a substantially horizontal top rail;
      a pair of downwardly extending vertical arms substantially perpendicular to the top rail, each vertical arm extending from an opposed end of the top rail;
   the upper clamp further including:
   a pair of top brackets intermediate the vertical arms, each top bracket having rubber strip thereon and a first end fixed to the top rail and a second end fixed to one of the pair of vertical arms such that the rubber strip of each top bracket is contactable by an upper portion of a pipe; and
   at least one upper block mounted to the top rail wherein each upper block is contactable by a second upper portion of a pipe;
   wherein the downwardly vertical extending arms of the upper clamp are releasably fastenable to the upwardly extending vertical rails of the lower clamp such that when in contact, the frictional forces between the pair of top brackets and the pair of lower brackets and the pipe and the at least one upper block and the at least one lower block and the pipe, prevent longitudinal and lateral movement of the pipe; and
   wherein the vertical arms of the upper clamp are telescopically adjustable within the upwardly extending vertical rails of the lower clamp.

2. The pipe intermodal logistics apparatus of claim 1 wherein the vertical arms of the upper clamp are downwardly pressured a pre-determined distance into the upwardly extending vertical rails of the lower clamp prior to being releasably fastened to the lower clamp.

3. The pipe intermodal logistics apparatus of claim 1 wherein the at least one lower block is fastenable to the base rail at a plurality of locations along the base rail.

4. The pipe intermodal logistics apparatus of claim 1 wherein the least one upper block is fastenable to the top rail at a plurality of locations along the top rail.

5. The pipe intermodal logistics apparatus of claim 1 wherein the upper and lower clamps are interchangeable in position within the pipe intermodal logistics apparatus.

6. The pipe intermodal logistics apparatus of claim 1 wherein the lower clamp and the upper clamp each include a pair of corner stands to retain the lower clamp and the upper clamp in an upright position when placed on the ground.

7. The pipe intermodal logistics apparatus of claim 6 wherein each corner stand includes an apertured base corner casting for fastening the said lower and upper clamps to a transportation vehicle.

8. The pipe intermodal logistics apparatus of claim 1 wherein each lower and upper block includes a rubber strip to contact a portion of a pipe.

9. The pipe intermodal logistics apparatus of claim 1 wherein the apparatus longitudinally and laterally retains pipe having a 42" diameter.

10. The pipe intermodal logistics apparatus of claim 1 wherein the apparatus longitudinally and laterally retains pipe having a 53" diameter.

11. A pipe intermodal logistics system comprising at least two pipe intermodal logistics apparatus of claim 1 wherein each pipe intermodal logistics apparatus is vertically stackable on top of another pipe intermodal logistics apparatus.

12. The pipe intermodal logistics system of claim 11 wherein each pipe intermodal logistics apparatus vertically stackable on top of another pipe intermodal logistics apparatus is releasably fastenable thereto.

* * * * *